HIGH SPEED-VIDEO TAPE RECORDING

Filed June 16, 1960

R. Lee Hollingsworth INVENTOR.

3,236,942
HIGH SPEED-VIDEO TAPE RECORDING
R. Lee Hollingsworth, 110 Fox Blvd., Massapequa, N.Y.
Filed June 16, 1960, Ser. No. 36,678
2 Claims. (Cl. 178—6.6)

This is a continuation in part of patent application Serial No. 661,315 filed May 24, 1957, now U.S. Patent No. 3,004,111.

The present invention relates to magnetic sound and video recording.

In the case of multi-track magnetic tapes, it is necessary to have means for recording on, or reading off of, each intelligence bearing magnetic track area individually, singly or at high speed transverse scanning rates.

The present invention provides transducer heads having a plurality of layers of magnetic material of highly permeable alloys or iron oxide plating, separated by layers of non-magnetic material as copper, aluminum or plastic-like coating, each layer of magnetic material constituting a separate magnetic circuit having individual recording gaps of the same number as the number of tracks desired on the tape. However it is still necessary to select the desired one of the programs on the respective track for long playing records.

In the present invention, there is provided means for high speed transverse scanning of a magnetic tape.

In accordance with the present invention, the recording of electrical signals corresponding to television picture signals, and recording and storing signals corresponding to various kinds of physical observations, including radar and transponder signals, and business machine data, is accomplished.

A purpose of the invention is to provide at least a two-piece magnetic circuit recording head device in which the winding carrying piece is selectively magnetically energizable with any desired one of an assembly of magnetic gap elements.

A further purpose of my invention is to provide a track selecting magnetic circuit in which a rotatable magnet selects the circumferentially positioned end or ends of the magnet elements corresponding to the desired intelligence track on the recording medium.

A further purpose of my invention is to provide means for magnetically recording and reproducing intelligence and data by means of a recording head having thin magnetic lamination with record-readout gaps in operating relation to the tape, and selectively engageable by rotatable travelling magnetic connecting means. The invention will now be explained with reference to the accompanying drawings wherein—

Figure 1:
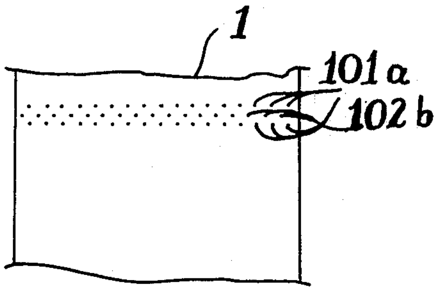
FIGURE 1 illustrates the present invention. The tape is passed between the pole areas of a horse shoe magnet carrying video energy and other energy.
Figure 2:
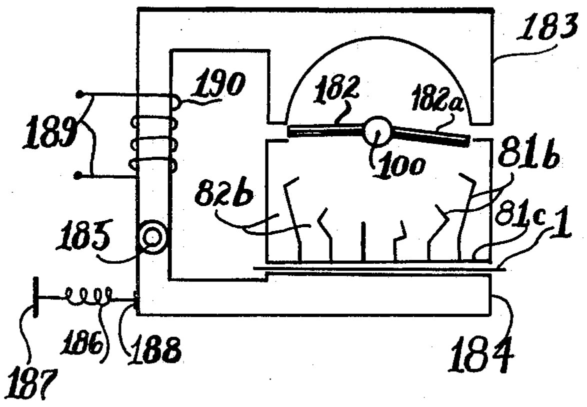
FIGURE 2 is a side view of the magnetic gap with the tape positioned to pass through the gap.
Figure 3:
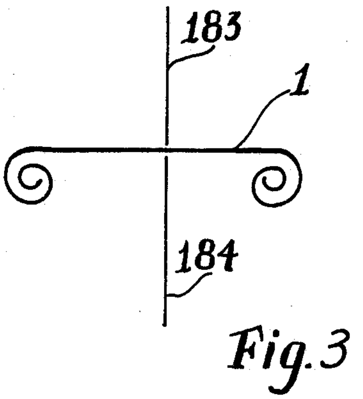

FIGURE 3 shows the recorded pattern resulting from the line interchange method of scanning providing the minimum value perfectly arranged grey pattern which may be locally generated. Here one scan of the multiplicity of gaps preferably represents one horizontal television line. Referring in details to the drawings:

FIGURE 1 illustrates an embodiment of the invention wherein the move between the two sections of a magnet, through which is flowing video frequency energy to be recorded. Here the recording takes place within the magnetic circuit of preferably one lamination 183 and 184 comprising a closed magnetic circuit by way of rotating magnetic shorting element 182 and 182*a* which is mounted on shaft 100; magnetic connection 81*b*; through tape 1 to the other pole of the lamination or magnet 184. Spacings 82*b* are indicative of insulating material between laminations 81*b*. Pole unit 184 is preferably hinged at 185 to allow the gap through which tape 1 is threaded to be opened against spring 186 which is attached at 188 and to support means 187. Video input terminals are indicated at 189, while the video electromagnetic windings are shown at 190. The thin and flat construction of the laminae helps to reduce the inductive fields of the individual laminations and of the head group when assembled together. Furthermore, magnetic heads are capable of registering very high frequencies across the recording gaps, when the horseshoe magnet forming the gap-head area is very thin, or composed of an electroplated layer of iron oxide or an alloy containing same, preferably upon a non-magnetic material such as for example ceramics, and the present invention encompasses this feature in that the materials leading to recording gap through which tape 1 passes may comprise a very thin layer or iron oxide plate upon a low hysteresis material to provide a magnetic path leading to the gap which is highly conductive of very high frequency electromagnetic energy.

When laminae 81*b* are as many in number as from 500 to 650, and constructed substantially as heretofore set forth, at least one, horizontal television picture lines, may be recorded within one traverse of the laminae by 182 or 182*a*. Each of the laminae may terminate, if desired, on a thin magnetic line 81*c* that faces the tape 1 since at any instant the magnetic force is concentrated to a very large degree directly through the tape at the instant position of magnetic distributor 182 or 182*a*. The magnetic tape 1 may also fit into a recording slot between magnetic connections 81*b*. Magnetic shorting or scanning distributors 182 and 182*a* are preferably offset across the shaft 100, to provide a halftone recording pattern.

When a great number of laminae 81*b* are confined in the total thickness of two inches, more or less, transverse recorded lines can be so close together on the recording tape as to approach, equal, or exceed the information packing density of photography at greatly reduced tape speeds. With such high packing densities, certain transverse line tracking problems disappear in that the scanning lines are substantially joined together when read off to be transmitted. It is most important that the tape move at constant speed.

Modulation of all known types or combinations thereof, limiting, automatic volume control, filtering and wave shaping methods and techniques presently known to the telecommunications art and sciences, are all applicable in combination, including frequency and phase modulation patents heretofore issued to me, in carrying the present invention into practice.

Recording in multi-color is accomplished by printed magnetic coding dots which are in control of the scanning in the camera as set forth in my pending patent application No. 820,990 and the same electrical impulses are transmitted to control the color in television receivers and in recording.

It is a part of the present invention, that the travelling magnetic scanning or distributor means may be stopped at a calibrated position within the scanning range, to record or readout any specific recording track area, thus one recording head winding 189 may serve many longitudinal sound tracks on a tape. However, to accommodate several sound channels, all carrying different programs simultaneously, the program material may be sub-carrier recorded on a main carrier, being recorded in accordance with the high speed system hereof.

Where magnetic scanning is used in the specification it usually signifies the distributing of magnetism, even though substantially instantaneous in occurrence, from one magnetic circuit to another and a part of the time through a moving magnetic medium such as a magnetic tape, or through a solid magnetic tape.

It is to be appreciated, that when a rotating gap is used in the present invention, the gap may be moved sideways as it rotates. This means that the gap plane is shifted 90-degrees to provide the sideways movement transversely of the tape. This defines the accurate boundaries of each transverse line, which allows the lines to be placed closer together, without interline cross talk, which increases the packing density of the tape.

Departures may be made from this specification and drawings in carrying the invention into practice within the scope and meaning of the appended claims.

I claim:

1. A magnetic transducer system including an electromagnetic recording means comprising a stationary magnetic loop, a source of intelligence bearing electric wave energy supplied to energize said transducer via a coil mounted on said magnetic loop, within said magnetic loop a section comprising at least a portion of the face of a circle, within the center of said half circle a rotatable shaft and means for rotating said shaft at a controlled speed, a magnetic distributor-like connecting means mounted on said shaft to make magnetic contact with said circle and with the ends of a multiplicity of magnetic connectors the other ends of which terminate to one side of a tape slot within said magnetic loop, a tape and means for moving said tape longitudinally at controlled speeds through said slot, the other side of said tape slot completing the said magnetic loop, said magnetic loop preferably comprising a magnetic material plating forming said magnetic loop via said distributor-like means, said magnetic material plating thickness substantially defining the width of each transverse recorded line across the said tape.

2. The invention in accordance with claim 1, wherein the said magnetic distributor-like connecting means is eccentric from a straight line across said shaft.

References Cited by the Examiner

UNITED STATES PATENTS

| | | | |
|---|---|---|---|
| 2,511,121 | 6/1950 | Murphy. | |
| 2,690,473 | 9/1954 | Cooley | 178—6.6 |
| 2,734,941 | 2/1956 | Zenel | 178—6.6 |
| 2,831,180 | 4/1958 | Hasbrouck | 178—100.2 X |
| 2,909,616 | 10/1959 | Marty | 179—100.2 |
| 3,081,382 | 3/1963 | Westmijze | 178—6.6 |

DAVID G. REDINBAUGH, *Primary Examiner.*

NEWTON N. LOVEWELL, ROY LAKE, *Examiners.*